March 20, 1962  E. L. McKENZIE  3,025,764
RETROREFLECTIVE ELEMENTS AND STRUCTURES
Filed Oct. 4, 1956

INVENTOR.
EUGENE L. McKENZIE
BY
*Carpenter, Abbott, Coulter, & Kinney*
ATTORNEYS

United States Patent Office 3,025,764
Patented Mar. 20, 1962

3,025,764
RETROREFLECTIVE ELEMENTS AND STRUCTURES
Eugene L. McKenzie, North St. Paul, Minn., assignor to Minnesota Mining and Manufacturing Company, St. Paul, Minn., a corporation of Delaware
Filed Oct. 4, 1956, Ser. No. 613,911
25 Claims. (Cl. 88—82)

This invention relates to improvements in reflex reflectors in which a layer of small glass beads or spherelenses are positioned in optical connection with light reflecting means underlying their back extremities, so that a large proportion of an incident ray of light striking the surface of the structure is returned by refraction and reflection in a brilliant cone having its axis common to the axis of the incident ray, even though the incident ray strikes the structure at an angle to the perpendicular. More particularly, this invention relates to improved sphere-lenses useful in making reflex reflecting structures and to a method for making these sphere-lenses.

The sphere-lenses of this invention are composite two-element, transparent structures having an inner transparent glass bead core of generally high refractive index ($n_D$) coated with an adherent concentric transparent layer of lower refractive index. The coating may serve primarily as a space coating to impart to the composite sphere-lens an effective refractive index higher than the refractive index of its core, or it may serve primarily to impart color to the composite sphere-lens, or it may serve both functions.

Coating of bead cores with the primary objective of providing an increased effective refractive index is commonly referred to as space coating in this art. As discussed in U.S. patent to Palmquist et al., No. 2,407,680, particularly with reference to FIGURE 4 of that patent, the desirable thickness of a space coating on a bead core is a function of the diameter of the bead core and the particular refractive index exhibited by the bead core, and will vary depending upon the results desired in a reflex-reflective sheeting.

The problem of providing optically satisfactory uniform space coatings about glass beads is highly complex; see, for example, the discussion in U.S. Patent 2,713,286 to Taylor. The minute size of small glass beads particularly complicates the problem. Billions of the smaller beads are required to fill a cubic foot. A monolayer may comprise many thousands per square inch. For best results in terms of desired optical performance properties in the finished reflex reflecting structure, the space coating about each bead should be of essentially uniform thickness, and there should not be a wide variation in the coating thicknesses on graded beads. A coating thickness variation as little as $10^{-5}$ inch has a significant effect on optical properties (i.e., "effective refractive index") of beads 50 microns or less in diameter. Bead cores having generally high refractive indices, e.g., refractive indices on the order of 2.2 or above, present a particularly difficult problem in space coating inasmuch as the desired coating should be but a minor fraction of the diameter of the bead if a resulting effective refractive index of about 2.9 is desired (such being particularly desired for lens elements in structures such as illustrated in FIGURE 4 of the aforementioned Palmquist et al. patent), and yet the coating must be essentially uniform. Additionally, coating must be accomplished in such a manner as to avoid agglomeration or sticking together of beads, and it must be accomplished in a manner that is practical for commercial operations in order to be useful in this art.

It is to problems such as the foregoing that this invention provides a practical solution.

According to this invention beads may conveniently be provided with transparent concentric coatings of essentially uniform thickness as required. Composite sphere-lens elements formed according to this invention possess desired permanence and stability of structure, and resist abrasion in use.

Advantageously, coatings about beads as taught herein are not dependent upon residual materials remaining in the glass structure of the bead after leeching its outer surface, as taught in the aforementioned Taylor patent. Moreover, sphere-lenses hereof, as compared to those of the Taylor patent, have been found to impart greater brilliance of reflex reflection to signs and markers in which they are used.

By the practice of this invention, beads may be provided with transparent coatings of a wide variety of colors and hues so as to impart varied attractive and brilliant nighttime, as well as daytime, color effects to signs and markers where they are used. Also, reflex reflecting structures of improved angularity can be formed using the sphere-lenses hereof.

Coatings formed about beads using the process of this invention, instead of containing large pores (as, indeed, might be expected when one considers the preferred process of manufacture employed), are essentially smooth and uniform in nature, which makes it possible to provide the coated beads hereof with smooth hemispherical reflective coatings of aluminum, or other materials, using vapor deposition techniques.

Following the practice of this invention, composite, two-element sphere-lenses, which possess the foregoing as well as other advantageous properties, are manufactured by a method which is both economical and simple, so as to be commercially practicable, and yet is surprisingly effective to provide essentially uniform concentric coatings of controlled thickness about minute spherical elements. Briefly stated, the preferred method involves a series of steps directed toward the in situ formation of a silica gel coating about spherical glass beads, and then drying the gel.

While glare-reducing silica gel coatings on relatively large glass surfaces are well known, none to my knowledge has ever been formed on small glass beads as herein described. Indeed, methods heretofore employed are not effective in the art to which this invention appertains.

In the illustrative drawings made a part hereof:

Additional illustrative reflex reflecting structures in which my sphere-lens elements can be used to impart improved properties are set forth in the aforementioned U.S. patent to Palmquist et al., and the disclosure of that patent is here incorporated by reference.

Figure 1:
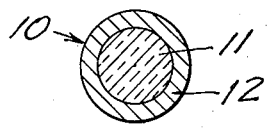
FIGURE 1 is an exaggerated diagrammatic cross section through a composite sphere-lens hereof.

My sphere-lenses 10 (see FIGURE 1) have a spherical transparent glass bead core 11, and an adherent, transparent, in situ-formed coating 12 concentrically about the glass bead core. The glass bead core is usually not greater than about 125 microns in diameter (a micron being a thousandth of a millimeter) and is preferably in the range of about 10 to 100 microns in diameter. Bead cores of larger diameter than 125 microns, when coated according to this invention, do not seem to impart noteworthy additional improvements to most reflex reflectors so as to necessitate their use in such structures. However, such larger bead cores may be used if desired. As an illustration, bead cores as large as about 30 mils in diameter (a mil being a thousandth of an inch; there are about 25 microns in one mil) have been coated successfully using my process.

The coating 12 varies in thickness according to the desiderata for increased effective refractive index, spacing coatings being, necessarily, an optically significant fraction of the total diameter of the sphere-lens. Coatings employed primarily to impart color to a sphere-lens need be only on the order of a micron in thickness.

The composition of the coating 12 of this invention may vary slightly, depending upon slight variations in its method of manufacture, as will be explained; but for purposes of description, my preferred coating may be considered as consisting essentially of silica gel in a substantially dry condition, even though small amounts of alkali, as well as color pigment, may form a small proportion thereof. In a less preferred embodiment of the invention, the amount of sodium, or equivalent, remaining in the coating is somewhat larger, but still forms only a minor proportion of the coating. In all cases, my coatings analyze chemically to contain at least a major proportion, i.e., well over 50% by weight, of silica.

My coating is a continuous essentially uniform film, optically homogeneous in that it permits the passage of light waves therethrough without substantial or significant refraction of the waves internally within the coating per se. Light waves, however, are refracted at interfaces between surfaces of the coating and adjacent light transmitting media of different refractive index (e.g., between the coating and the bead core). My coating appears to be a smooth continuous film even when magnified 400 times, any submicroscopic pores, if present, being insufficient to materially affect desired physical and optical properties.

The refractive index of the coating varies somewhat, depending upon slight variations in its method of manufacture, but for the most part is, advantageously, substantially the same as that of materials used in many reflex reflecting structures (see the aforementioned Palmquist et al. patent) for transparent covering coatings (i.e. about 1.5). Specifically, the refractive index of my coating varies from about 1.46 to 1.5. While my coating is of a refractive index lower than that of the core, a space coated core of this invention exhibits an effective refractive index higher than the refractive index of the underlying glass bead core. Of course, if a thin coating is applied to the core primarily to impart color to the resulting sphere-lens, no particular or significant increase in the effective refractive index of the composite may be noticeable.

The coating of glass cores is accomplished according to this invention by mixing beads in an aqueous suspension of a soluble silicate, to be described more fully hereinafter, and atomizing the mixture into individual particles. Since atomization is accomplished by spraying the mixture, it is surprising that the beads end up with any coating at all. One might expect that the solid beads and liquid soluble silicate would separate during spraying. Surprisingly, however, atomization, as hereinafter further explained, effectively provides individual particles consisting of a bead core surrounded by a soluble silicate coating. The atomized particles are maintained in a free falling condition, and while free falling, are at least partially dried. The dried particles are then collected and, in the preferred embodiment of my process, treated with an aqueous solution of an acid substance reactive with the alkali portion of the coated soluble silicate so as to remove most of the alkali portion thereof. Thereafter, the particles are dried by heating them to an elevated temperature above the boiling point of water but below any temperature causing devitrification of the glass of the core, or melting and fusion of the applied coating. Durable, weather-resistant, chemically-resistant sphere-lenses are formed by this process. Where the durability, weather resistance and chemical resistance of a coated bead core can be sacrificed to some extent, I may omit the treatment with acid substance aforeindicated.

Glass beads for my process may have any desired glass composition but will generally have refractive indices of at least 1.7. For space coating purposes, if the resulting sphere-lens elements are to be used in reflex reflective structures which are top coated so as to provide a flat exposed front surface (e.g., structures such as taught in the aforementioned Palmquist et al. patent), the refractive index of beads to be coated is preferably at least 1.9, or higher. Beads of a refractive index much below about 1.9 require extremely thick coatings for proper spacing relationships in these structures (i.e., coatings as thick as more than 100% of the bead diameter, see Palmquist et al.), and thus their use in such structures is impractical. As the refractive index of beads to be coated for use in such structures is increased, the required thickness for the spacing coat decreases, beads of a refractive index of 2.9, theoretically, not requiring a spacing coat for such reflex reflector use. Few beads of extremely high refractive index, however, are known; and those known are usually expensive to manufacture because of the nature of the raw materials needed for their composition. For that reason, it becomes commercially practicable to employ beads of a somewhat lower, but still high, refractive index, and to space coat them so that they exhibit an effective refractive index of about 2.9 for such reflex reflecting structures.

Of course, while space coating of extremely high refractive index beads may not be necessary, they may be coated according to this invention for the primary purpose of imparting color thereto. Likewise, while beads of a refractive index as low as about 1.7, or even lower, are not ordinarily space coated in this art (i.e., coated with a sufficient thickness of material to provide an effective refractive index for the composite which is somewhat higher than the refractive index exhibited by the core), the teachings herein may be used for such a purpose, and/or to impart color thereto. It will be apparent, therefore, that space coating of bead cores, as the term "space coating" is employed herein, is not necessarily limited to the formation of sphere-lenses which exhibit an effective refractive index of 2.9, or on the order thereof, but includes the formation of sphere-lenses which exhibit other, even substantially lower, effective refractive index values, and which are suitable for use in reflex reflecting structures designed for certain specialized effects.

Sodium silicate will ordinarily be used as the soluble silicate for coating as taught herein because of its availability and economy; however, equivalent soluble silicates, e.g. potassium silicate, are suitable to employ. The ratio of the alkali to silica, e.g., $Na_2O$ to $SiO_2$, in the silicate may vary considerably, usually being within the range of about 1:2 to 1:4, a ratio of about 1:3.75 giving particularly good results. In general soluble sodium silicate which has a low ratio of $Na_2O$ to $SiO_2$ is preferred from the standpoint of its reduced alkalinity which permits neutralization to be more readily accomplished and with less quantity of acid substance; however, as the ratio of $Na_2O$ to $Si_2O$ becomes extremely low, the silicate becomes less soluble and problems arise with respect to maintaining it in a suitable aqueous solution. The concentration and viscosity of a soluble silicate in water may be varied to achieve different coating thicknesses, the more concentrated and viscous solutions being employed advantageously for thicker coatings. Preferred concentrations for sodium silicate in water, as a general rule, lie within the approximate range of about 20 to 40% by weight, the higher concentrations being readily attainable at raised temperatures.

A small amount of transparent coloring material such as for example, phthalocyanine green, phthalocyanine blue, "Lithosol Red CSP" paste, "Lithosol Fast Yellow 3GD" paste, "Lithosol Orange OTP" paste (such pastes being products marketed by E. I. du Pont de Nemours & Co.), etc., may be incorporated in the sodium silicate solution, or equivalent, to impart color to the composite sphere-lenses. Color pigments or materials employable may be water soluble or insoluble; however, they are preferably somewhat soluble and should be at least readily dispersible in the aqueous solution of soluble silicate. Coloring mixtures may contain up to about 10% by weight of coloring solids based upon the weight of soluble silicate in the solution. Coloring materials are preferably sufficiently resistant to heat so as to withstand the temperatures employed in drying the coating.

In practicing the method of this invention, glass beads are thoroughly dispersed, as by stirring, in a sodium silicate solution to form a slurry, and are maintained uniformly dispersed in the mixture while the mixture is atomized into a drying chamber. Usually the glass cores to be coated will acount for at least about 50% by weight of the slurry. Atomization of the slurry into small droplets consisting of a glass bead core surrounded with a layer of the sodium silicate solution is suitably accomplished by spraying the mixture under pressure through a fine orifice nozzle using auxiliary air, under pressure, to break the mixture into droplets as it emerges from the spray nozzle. While the pressure of this auxiliary air will be set sufficiently high to break the mixture into droplets it will not be so high as to cause the silicate solution to be blown free from the beads.

The use of auxiliary air to break the slurry into droplets is not absolutely necessary in all cases; thus, if desired, one may in some cases employ sufficiently high pressures to force the slurry through the nozzle and simultaneously break it into droplets.

The mixture or slurry may be sprayed at room or elevated temperature. The viscosity of the slurry drops rapidly upon heating, which aids in atomizing the slurry; therefore, in the usual case it is preferable to employ slightly elevated slurry temperatures, e.g. about 150° F. or so, to accomplish atomization.

As soon as the particles of slurry are formed by spraying, surface tension forces tend to cause the fluid coatings about the glass cores to become essentially uniform in thickness. The particles of slurry are immediately subjected to drying conditions while they are free falling, that is, while they are moving freely through space. Drying can be accomplished at room or elevated temperatures. Flash drying at greatly elevated temperatures is not preferred inasmuch as it generally causes the formation of brittle and uneven coatings which adhere poorly to the bead core. Air temperatures up to those near the boiling point of water are suitable to employ in drying. In the drying chamber the beads fall freely through the air until their coatings have sufficiently gelled as a result of loss of water so as not to stick to the walls of the chamber nor cake into an aggregate when collected.

After this drying step, the coated beads are treated, in the preferred embodiment of my process, with an acid substance in aqueous solution to neutralize the coatings by reacting with the alkali constituent thereof to cause the formation of a silica gel. The coated beads are mixed with violent agitation in a water solution containing an amount of the acid substance calculated on a molar basis to be sufficient to react with most or essentially all of the alkali portion of the coatings on the beads and effect substantial neutralization thereof. Treatment is usually accomplished at somewhat elevated temperatures, e.g., above 100° F. up to the boiling point of water. The time allowed for neutralization to take place will vary depending upon such factors as, for example, the concentration of the acid substance employed, its ability to react with most of the alkali portion to remove the same, the extent of neutralization desired, etc., a time of about one hour at about 200° F. ordinarily being adequate when solutions of sufficient concentration of acid substance are employed. Various acid substances may be used to effect substantial neutralization. Hydrochloric acid, ammonium chloride, nitric acid, sulfuric acid, etc., are but illustrations of useful acidic materials. Aqueous solutions of acidic chlorides are especially desirable to employ in neutralization inasmuch as the resulting chloride salt, e.g., sodium chloride, is readily soluble in water and easily removed from the coated beads.

The coated beads are then separated from the acid wash and dried at an elevated temperature above the boiling point of water but below temperatures causing devitrification of the glass bead core, e.g., usually not over about 700° F., so as to drive out substantially all of the water in the silica gel coating, shrink the coating and leave it in a rigid adherent tough transparent condition about the bead cores. The temperature of drying is, of course, well below temperatures at which the glass of the bead core melts, as well as below temperatures at which the coating on the core melts and flows. In most cases drying can be accomplished satisfactorily and adequately at temperatures below about 400° F. within one or two hours time. If the acid treatment is omitted, drying as aforedescribed serves to rigidify the coating and tends to render it very difficultly soluble in water.

As a specific preferred illustration of my process, transparent glass beads of minute diameter (i.e., 90% of the beads ranging from 18 to 26 microns diameter) having a refractive index of 2.49 (said beads analyzing 67.5% lead oxide and 32.5% titanium dioxide), were mixed in a water solution of sodium silicate to form a slurry containing about 67% by weight of beads and 33% sodium silicate solution. The sodium silicate had a ratio of $Na_2O$ to $SiO_2$ of 1:3.75 (available under the name "S-35" brand from Philadelphia Quartz Company), and was at a concentration of 33% sodium silicate solids in water solution.

The slurry was placed in a closed container under pressure and maintained at a temperature of 150° F. It was continuously agitated to keep the beads in suspension, and was sprayed through a $\frac{1}{16}$ inch nozzle using a pressure of 6 p.s.i. in the closed container so as to maintain a continuous supply of slurry to the nozzle. As the slowly moving slurry emerged from the spray nozzle, air from a suitable source under a pressure of 60 p.s.i. was directed through an orifice concentric with the spray nozzle, as well as also through separate orifices which directed jets of air at an angle through the emerging slurry. The air flow through the orifice concentric with the emerging slurry, and therefore parallel to its movement, served primarily to speed up its movement, whereas the jets of air directed at an angle through the emerging slurry served primarily to break it up into droplets containing a central bead core surrounded by a film of sodium silicate. A suitable spray gun to accomplish atomization as here described is one marketed by Binks Manufacturing Co. of Chicago, Ill. Binks Model Number 18 Pressure Cup Spray Gun, with Number 65P air cap, and Number 66 nozzle, has been found satisfactory.

The slurry was sprayed directly into a drying chamber where the droplets moved or fell freely through air held at about 150° F. until the sodium silicate coatings gelled as a result of loss of water. The time that the droplets were free falling was about ten seconds. Immediately after the droplets were formed and while they were free falling, surface tension forces acted in a manner to cause each bead to be surrounded by a concentric layer of silicate.

After this initial drying, the coated beads were collected and added slowly and with violent agitation to a 30% ammonium chloride solution in water, the ratio of beads to acid solution being about 3 to 1 by weight. With continued agitation, the mixture was raised to 200° F. and maintained at this temperature under agitation for one hour, after which the resulting water solution was decanted from the beads. The product was then filtered to remove further water, together with constituents dissolved therein, and dried by heating to 350° F. for one hour. The resulting glass bead cores had concentric, transparent, uniform coatings consisting essentially of substantially dried silica gel. They contained only a trace of residual sodium. The coatings on the beads were, on the average, about 2 microns in thickness, and the composite elements exhibited effective refractive indices of about 2.9, indicating that the beads were suitably space coated for reflex reflector use in structures employing a flat top coating (see FIGURE 5) of a refractive index of about 1.5, without requiring a special flat spacing layer over the back reflector (note the aforementioned Palmquist et al. patent).

It will be readily appreciated that by using increased concentrations of sodium silicate thicker coatings about beads can be formed. Alternatively, if desired, the thickness of a coating can be built up layer by layer upon bead cores, by repeating the foregoing illustrative process several times, as necessary to achieve desired thicknesses.

A major advantage and improvement in this art, gained through practice of my process, lies in the facility with which sphere-lenses of optimum optical properties can be prepared in various colors. It is now possible to prepare durable weather resistant sphere-lenses in a wide variety of colors and hues. To coat glass beads with a color pigment, the process aforeillustrated may be used, and the desired pigment (e.g., 3% by weight of phthalocyanine green solids based on the weight of soluble silicate in solution) merely added to the soluble silicate solution employed in coating.

The sphere-lenses of this invention are useful as elements in a wide variety of reflex reflecting structures. They are useful as lens elements in reflex reflecting liquid paint and lacquer finishes which are adapted to be applied, as by spraying, to a wide variety of surfaces.

Figure 2:
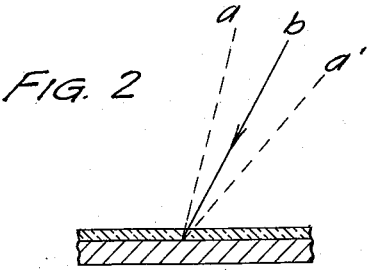
FIGURE 2 is a diagrammatic illustration of reflex reflection, showing the return of light in a brilliant cone, illustrated as bounded by $a$ and $a'$, having its axis essentially common with the incident ray $b$ striking the flat reflex reflecting structure.
Figure 3:
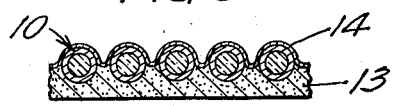
FIGURES 3 to 5 are highly magnified diagrammatic views in cross section of various illustrative reflex reflecting structures of this invention, employing as a part thereof the new sphere-lenses herein taught.

As an illustration of reflex reflecting structures of improved angularity and brilliance made possible by this invention, the simplified structure of FIGURE 3 will first be taken. Here my sphere-lens elements 10 are bonded in a layer 13 having a reflective pigment such as titanium dioxide dispersed therethrough. The reflective pigment does not cover the exposed lenticular surface of the structure, and thus a beam of light from any suitable source striking the structure, either at an angle from the perpendicular as illustrated in FIGURE 2, or directly perpendicular to the structure, passes through my sphere-lens elements to the reflective pigment where it is reflected and returned back through my sphere-lens elements, and emerges in a brilliant cone, the axis of which is essentially common with the incident ray. As illustrated in FIGURE 3, a thin transparent protective layer 14, suitably of a refractive index lower than that of the bead cores of the sphere-lenses employed, may be applied over the structure; however, such layer may be omitted. Structures which have a lenticular exposed surface, as illustrated in FIGURE 3, are preferably formed by using composite sphere-lens elements, as taught herein, which have effective refractive indices of about 1.9, although elements of higher refractive index may be dispersed in the layer so as to impart varied properties to the sheet.

Figure 4:
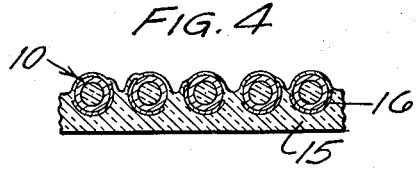

In FIGURE 4, a further structure is illustrated comprising a transparent binder layer 15, which may be colored or clear, and in which are embedded my sphere-lens elements 10, each being hemispherically coated with a layer 16 of reflective material such as, for example, silver (such being suitably accomplished by vapor deposition of silver upon the sphere-lens elements after previously pressing the elements part way into an easily removed temporary binder material, and thereafter, separating the elements from the temporary binder material). As illustrated in FIGURE 4, the hemispherically coated sphere-lens elements may assume random orientation in the binder layer 15, but a sufficient number of elements are in suitable position for desired reflex reflection. By using teachings herein, the simple structure such as here illustrated can be made to exhibit any of a wide variety of colors. As in the case of the lenticular structure of FIGURE 3, this lenticular structure of FIGURE 4 preferably is formed using at least a substantial proportion of sphere-lens elements which exhibit effective refractive indices of about 1.9.

Figure 5:
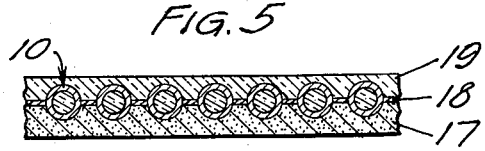

FIGURE 5 illustrates a smooth or flat surfaced structure (i.e., a non-lenticular surface structure) having a binder layer 17 in which a reflective pigment is dispersed and in which a layer of my sphere-lens elements 10 are bonded in position so that only their back extremities are in contact with and surrounded by the material of layer 17. Between the sides of my elements 10 and overlying the reflective pigment layer 17 is a color layer 18 which does not cover the top or uppermost extremities of sphere-lens elements 10. Over the exposed sphere-lens elements and color layer 18 is a transparent protective layer 19 which provides a flat front face for the structure. Sphere-lens elements for use in this structure preferably have effective refractive indices approaching about 2.9 whenever flat transparent cover coatings of a refractive index around 1.5 are employed; see the optical teachings in the aforementioned Palmquist et al. patent. In that patent, the ratio of the refractive index of a bead core to the refractive index of a flat transparent cover coating is stated as desirably 1.15 or above, the preferred ratio being 1.9. Sphere-lens elements hereof having effective refractive indices of about 2.9, when used with transparent cover coatings having a refractive index of about 1.5, inherently satisfy this preferred ratio requirement.

Various materials may be used to fabricate the structures illustrated. N-butyl-methacrylate resin, and mixtures of this resin with various other resins are examples of suitable binder material or clear transparent cover coating material. Others will readily suggest themselves and many are set forth in the aforementioned Palmquist et al. patent, here incorporated by reference.

The structure of FIGURE 5 will be readily recognized as one adapted to provide a color under nighttime reflex reflecting conditions which is different from that color exhibited under daytime viewing conditions. At night, light from the headlights of a car (which is a typical example of a suitable source of light to illustrate the principles of reflex reflection) will strike the sign, pass through the sphere-lenses, and be reflected back to the occupants of the car. The color of the sphere-lenses, i.e., the coated cores formed as taught herein, in combination with the color, if any, of reflective material in binder layer 17, will govern the color exhibited by the sign under night reflex reflection viewing conditions. During the day, however, the color of the pigment in layer 18 will largely influence the color exhibited by the sign, although the color of sphere-lens elements 10 may, in certain color combinations, influence the total color effect experienced by an observer.

The simplified structure of FIGURE 4 is also readily adaptable to produce such a result. To illustrate a blue sphere-lens element, i.e., a bead core coated as taught herein with blue pigment, will cause brilliant blue to be the color of the sign of FIGURE 4 under nighttime reflex reflection, yet the color of the sign during the day will to a rather large extent be influenced by the color of any pigment settled behind and between the beads in the binder layer 15, or by the color of a backing material to which the structure is applied if this binder layer is transparent. Of course, the color of the sphere-lenses employed will, in most color combinations, influence the daytime color of the sign, frequently causing it to appear a color not exactly the color of the pigment between the sphere-lenses. This may be taken advantage of to produce unusual effects. For example, by employing yellow-blue combinations, i.e., yellow sphere-lenses bonded in a blue pigmented layer, the total effect during the day (by balancing pigment quantities and the density of sphere-lenses in the structure) will be that of a greenish color, while nighttime reflex reflection will bring out a brilliant yellow color.

Figure 6:
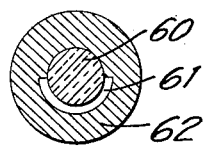
FIGURES 6 and 7 are exaggerated diagrammatic cross-sections through composite reflex-reflecting elements hereof.
Figure 7:
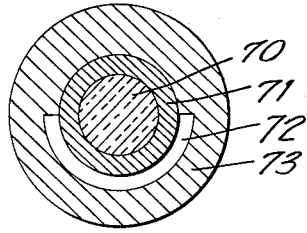

I have also used my process to make composite reflex reflecting elements having a central glass bead core 60 (see FIGURE 6), a coating of a reflective material 61 such as, for example, aluminum over a portion, usually a hemispherical portion, of the glass bead core, and a substantially uniform layer 62, formed as aforedescribed, completely surrounding the hemispherically coated core. Likewise, a glass bead core 70 (see FIGURE 7) coated with a layer 71 of silica gel or a layer analyzing to contain a major proportion of silica, as aforedescribed, may then be coated with a hemispherical coating of a reflective material 72; and thereafter, the composite may be coated with an additional layer 73 of silicate using the teachings hereof.

These composite reflex reflecting elements are particularly useful in reflectorizing various fabrics and other surfaces. This may be done by applying a binder layer upon fabric or the like, and then pressing the composite reflex reflecting elements, formed as here illustrated, into the binder layer. Because these composite reflex reflecting elements can be formed so as to contain color materials in their coatings, reflectorized fabrics which exhibit eye-appealing colors under both daytime and nighttime conditions can be formed.

Thus, this invention provides not only new and useful sphere-lenses, but a practical method for the commercial manufacture of the same, as well as various reflex reflecting sheet structures, many of simplified structure and all including, as a part thereof, the novel sphere-lenses herein taught.

That which is claimed is:

1. In a process for making transparent sphere-lenses, each comprising a small transparent glass bead coated with an optical inorganic layer containing a major proportion of silica, the steps including atomizing a slurry containing small transparent glass beads dispersed in an aqueous solution of alkali silicate into a plurality of discrete particles to thereby provide particles having a glass bead coated with said aqueous solution, gelling the coatings of said beads by removing water therefrom while said particles are free falling, and heating the coatings to substantially dry and rigidify the same at an elevated temperature above the boiling point of water, to thereby provide small transparent glass beads coated with an optical inorganic layer containing a major proportion of silica.

2. A process as defined in claim 1 in which the aqueous solution of alkali silicate contains a coloring material in quantity sufficient to provide observable color in the resulting coating.

3. In a process for making transparent sphere-lenses, each comprising a small transparent glass bead coated with an optical inorganic layer containing a major proportion of silica, the steps including atomizing a slurry containing small transparent glass beads dispersed in an aqueous solution of alkali silicate into a plurality of discrete particles to thereby provide particles having a glass bead coated with said aqueous solution, gelling the coatings of said beads by removing water therefrom while said particles are free falling, treating the resulting coated beads with an aqueous solution of an acid substance to remove a substantial proportion of the alkali from said coatings, and heating the coatings to substantially dry and rigidify the same at an elevated temperature above the boiling point of water, to thereby provide small transparent glass beads coated with an optical inorganic layer containing a major proportion of silica.

4. A process as defined in claim 3 in which the aqueous solution of alkali silicate contains a coloring material in quantity sufficient to provide observable color in the resulting coating.

5. Transparent sphere-lenses suitable for use in reflex reflecting applications as herein described, said sphere-lenses each comprising a small transparent glass bead having a diameter not in excess of 30 mils and an adherent transparent coating of substantially uniform thickness completely surrounding said bead, said adherent coating consisting of a rigid, substantially-dried, in situ-formed layer analyzing to contain a major proportion of silica.

6. Sphere-lenses of claim 5 having coloring material in the adherent coating thereof in sufficient quantity to provide observable color.

7. Sphere-lenses of claim 5, the glass beads of which have a refractive index of at least 1.7.

8. Transparent sphere-lenses suitable for use in reflex reflecting applications as herein described, said sphere-lenses each comprising a small transparent glass bead having a diameter not in excess of 30 mils and an adherent transparent coating of substantially uniform thickness completely surrounding said bead, said adherent coating consisting of a rigid, substantially-dried, in situ-formed layer consisting essentially of silica gel.

9. Sphere-lenses of claim 8 having coloring material in the adherent coating thereof in sufficient quantity to provide observable color.

10. Sphere-lenses of claim 8, the glass beads of which have a refractive index of at least 1.7.

11. Transparent sphere-lenses suitable for use in reflex reflecting applications as herein described, said sphere-lenses each comprising a small transparent glass bead having a diameter not in excess of 30 mils, and having an approximately hemispherical reflector coating, and an adherent transparent coating of substantially uniform thickness completely surrounding said bead and reflector coating, said adherent coating consisting of a rigid, substantially-dried, in situ-formed layer analyzing to contain a major proportion of silica.

12. Sphere-lenses of claim 11 having coloring material in the adherent coating thereof in sufficient quantity to provide observable color.

13. Sphere-lenses of claim 11, the glass beads of which have a refractive index of at least 1.7.

14. A structure adapted for reflex light reflection, as herein described, said structure comprising (1) a layer including transparent sphere-lenses, each comprising a small transparent glass bead having a refractive index of at least 1.7, a diameter not in excess of 30 mils, and having an adherent transparent space coating of substantially uniform thickness completely surrounding said bead, said adherent coating consisting of a rigid, substantially-dried, in situ-formed layer analyzing to contain a major proportion of silica, and (2) light reflecting means positioned in optical relation with the back extremities of said beads, the combination serving to produce reflex reflection of a beam of light striking the surface of said structure.

15. A structure adapted for reflex light reflection, as herein described, said structure comprising (1) a layer including transparent, colored sphere-lenses, each comprising a small transparent glass bead having a refractive index of at least 1.7, a diameter not in excess of 30 mils, and having an adherent transparent coating of substantially uniform thickness completely surrounding said bead, said adherent coating consisting of a rigid, substantially-dried, in situ-formed layer analyzing to contain a coloring material in sufficient quantity to provide observable color and a major proportion of silica, and (2) light reflecting means positioned in optical relation with the back extremities of said beads, the combination serving to produce reflex reflection of a beam of light striking the surface of said structure.

16. A structure adapted for reflex light reflection, as herein described, said structure comprising (1) a layer including transparent, colored sphere-lenses, each comprising a small transparent glass bead having a refractive index of at least 1.7, a diameter not in excess of 30 mils, and having an adherent transparent coating of substantially uniform thickness completely surrounding said bead, said adherent coating consisting of a rigid, substantially-dried, in situ-formed layer analyzing to contain a coloring material in sufficient quantity to provide observable color and a major proportion of silica, (2) light reflecting means positioned in optical relation with the back extremities of said beads, the combination of said sphere-lenses and light reflecting means serving to produce reflex reflection of a beam of light striking the surface of said structure, and (3) coloring material located between but not covering said sphere-lenses and differing in color-imparting properties from said sphere-lenses so as to cause the front of the structure to simulate a continuous painted appearance when viewed by day which is different from the appearance when viewed by night reflex reflection.

17. Essentially spherical composite reflex-reflecting elements, each comprising a small transparent glass bead having a diameter not in excess of 30 mils, a coating of reflective material over an approximately hemispherical portion of said bead, and an adherent transparent weather-resistant coating of substantially uniform thickness completely surrounding said bead and reflective coating.

18. Composite reflex-reflecting elements of claim 17 having coloring material in the adherent coating thereof in sufficient quantity to provide observable color.

19. Composite reflex-reflecting elements of claim 17, the glass beads of which have a refractive index of at least 1.7.

20. Essentially spherical composite reflex-reflecting elements, each consisting essentially of a small transparent glass bead having a diameter not in excess of 30 mils, a coating of reflective material over an approximately hemispherical portion of said bead, and an adherent transparent coating of substantially uniform thickness completely surrounding said bead and reflective coating, said adherent coating consisting of a rigid substantially-dried in situ-formed layer consisting essentially of silica gel.

21. Essentially spherical composite reflex-reflecting elements, each comprising a small transparent glass bead having a diameter not in excess of 30 mils and having an approximately hemispherical reflective coating spaced from the surface of said bead by a transparent layer of substantially uniform thickness, and an adherent transparent weather-resistant coating of substantially uniform thickness completely surrounding said bead and reflective coating.

22. Composite reflex-reflecting elements of claim 21 having coloring material in at least the adherent transparent weather-resistant coating thereof in sufficient quantity to provide observable color.

23. Composite reflex-reflecting elements of claim 21, the glass beads of which have a refractive index of at least 1.7.

24. Discrete essentially spherical composite reflex-reflecting elements, each comprising a small transparent glass bead having a diameter not in excess of 30 mils and having an approximately hemispherical essentially-uniformly-thick reflective coating spaced from the surface of said bead by a transparent layer of substantially uniform thickness adherent to said bead.

25. Discrete essentially spherical composite reflex-reflecting elements each comprising a small transparent glass bead having a diameter not in excess of 30 mils and having an approximately hemispherical essentially-uniformly-thick reflective coating spaced from the surface of said bead by a transparent rigid, substantially-dried, in-situ-formed layer of substantially uniform thickness analyzing to contain a major proportion of silica.

References Cited in the file of this patent

UNITED STATES PATENTS

| | | |
|---|---|---|
| 1,672,857 | Blake et al. | June 5, 1928 |
| 1,902,440 | Gill | Mar. 20, 1933 |
| 2,110,500 | Chiera | Mar. 8, 1938 |
| 2,114,692 | Ward | Apr. 19, 1938 |
| 2,267,995 | Shuger | Dec. 30, 1941 |
| 2,356,553 | Weissenberg | Aug. 22, 1944 |
| 2,407,680 | Palmquist et al. | Sept. 17, 1946 |
| 2,440,584 | Heltzer et al. | Apr. 27, 1948 |
| 2,474,061 | Moulton | June 21, 1949 |
| 2,536,764 | Moulton | Jan. 2, 1951 |
| 2,713,286 | Taylor | July 19, 1955 |

FOREIGN PATENTS

| | | |
|---|---|---|
| 263,066 | Switzerland | Nov. 1, 1949 |